United States Patent [19]

Koch et al.

[11] Patent Number: 4,486,123
[45] Date of Patent: Dec. 4, 1984

[54] UNDERWATER PIPE LAYING VESSEL

[75] Inventors: Ulrich Koch; Peter Plotz, both of Hamburg; Dieter König, Seevetal; Jochen Langer, Langenfeld; Burkhardt Switaiski, Meerbusch; H. Heinrich Schindler; Willi Wesselski, both of Cologne, all of Fed. Rep. of Germany

[73] Assignee: Blohm & Voss AG, Hamburg, Fed. Rep. of Germany

[21] Appl. No.: 419,697

[22] Filed: Sep. 17, 1982

Related U.S. Application Data

[63] Continuation-in-part of Ser. No. 363,439, May 30, 1982.

[30] Foreign Application Priority Data

Mar. 31, 1981 [DE] Fed. Rep. of Germany ....... 3112785

[51] Int. Cl.³ ............................................. B63B 35/04
[52] U.S. Cl. .................................. 405/169; 405/166; 405/158
[58] Field of Search ................................ 405/166–171, 405/154, 158

[56] References Cited

U.S. PATENT DOCUMENTS 2,780,376  2/1957  Sanders ........................... 405/166 X
3,389,563  6/1968  Postlewaite et al. ............... 405/166
3,581,506  6/1971  Howard ............................. 405/166
3,585,806  6/1971  Lawrence .......................... 405/166
3,680,322  8/1972  Nolan et al. ....................... 405/166
3,860,122  1/1975  Cernosek ......................... 405/166 X
4,068,490  1/1978  Jegousse .......................... 405/166

Primary Examiner—Dennis L. Taylor

[57] ABSTRACT

An underwater pipe laying vessel for laying a continuous pipeline, applying what is known as the "J" shape pipe laying method, uses shorter lengths of pipeline welded together on board end to end to form pipe assemblies; the pipe assemblies are stored and subsequently transported to a pipe laying boom unit which guides pipe assemblies to be welded end to end to a pipeline which is already in the "process of laying" under the vessel. The pipe laying boom is located substantially in the center of the vessel and is swivelled about a horizontal axis which is perpendicular to the length of the vessel; the boom includes a flash butt welder and an underlying jacketing-unit for suitably treating a welded surface of the pipeline to prevent subsequent corrosion; a pipeline section guide and pipeline section support located under the jacketing-unit assist in supporting and guiding the treated pipeline for proper positioning. Shorter lengths of pipe and the pipe assemblies are stored, handled and moved on board the vessel expediently on conveyors and rollers in such manner that the length of each pipe and pipe assembly is always parallel to the longer axis of the vessel. The invention provides very efficient and speedy pipe laying operation which is monitored from a control station on board the vessel.

26 Claims, 5 Drawing Figures

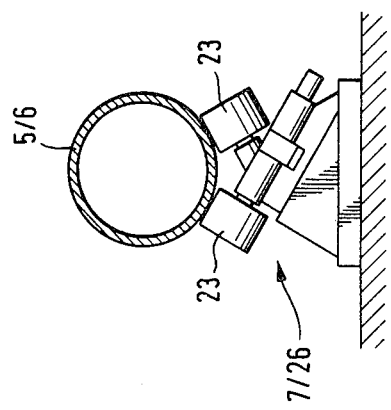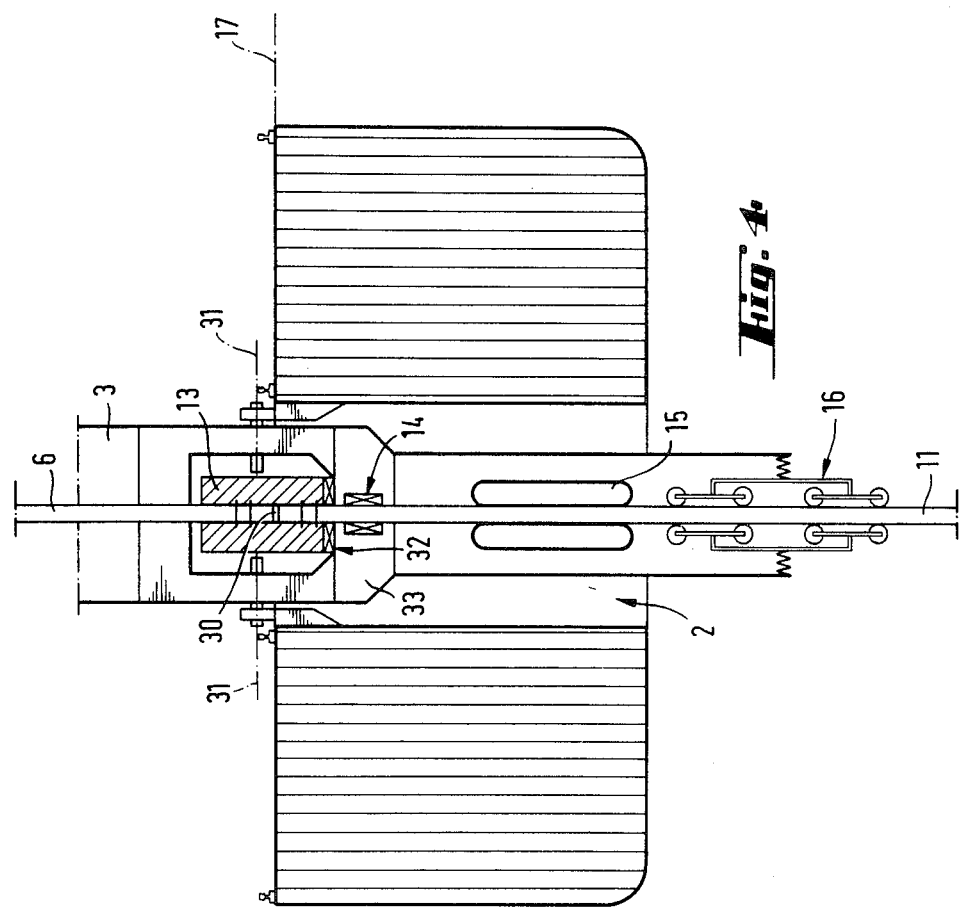

UNDERWATER PIPE LAYING VESSEL

FIELD OF THE INVENTION

This is a continuation-in-part of U.S. application Ser. No. 363,439, filed on Mar. 30, 1982.

This invention relates generally to mechanized underwater pipe laying, and more particularly to a ship or a vessel which includes apparatus for laying an underwater pipeline by welding on board shorter lengths of pipeline by progressively adding shorter lengths of pipeline to the free-end of a pipeline. Typically, the pipeline envisaged in the invention has large diameters of the order of 40", for example, and heavy walls of the order of 40 mm, the pipeline being suitable for laying into considerable water depths.

BACKGROUND OF THE INVENTION

Underwater pipeline installations are known to be performed using a variety of equipment in prior art; all the known arrangements and equipment, however, have left much to be desired regarding the speed of pipe laying as well as the reliability and efficiency of the operation.

At least two of the most desirable requirements for accurate, speedy and economical underwater pipe laying are to maintain stability of the ship or vessel during pipe laying operations in spite of adverse conditions of weather, high seas and winds, as well as achieving a fair amount of accuracy as to the course of the laid pipeline as compared to a planned pipeline route. Arrangements using two vessels or ships in a parallel position located side by side and supporting certain pipe laying equipment in a region between the ships are known in the prior art; however, the handling of pipes and the welding of pipes to an existing pipeline, the treatment of the welded joint and other associated operations are at best inefficient and sluggish; the structural arrangements required to support and control a pipe laying rig in between the two ships are not only elaborate and unwieldy, but also very expensive. It is also impractical to control the course of the pipeline with any reasonable degree of accuracy using an arrangement of two ships side by side since it would involve coordination of the movement of both the ships as well as coordination of the movements of the hoisting and control booms and the associated paraphernalia. Other situations in prior art where only one vessel or ship is used are known, but again, the speed of operation, and the efficiency as well as reliability of the welding and guiding operations are at best only poor. Furthermore, in most of the prior art operations, a major factor contributing to lack of efficiency and lack of speed has been the manner of handling the individual pipe lengths before they were prepared for welding, and the handling during the time they were actually welded to a free end of the pipeline. It has been found out by experimentation and experience that the manner of receiving the pipe lengths from an external supply source into a pipe laying vessel, the manner of storing the pipe lengths and the precise manner of subsequently handling the pipe lengths including the orientation of the pipe lengths throughout the time they are present on the pipe laying vessel prior to consumption play a vital role in influencing the efficiency and speed of the entire operation.

In particular, it has been found that if the individual pipe lengths are all received, stacked, stored and transferred during installation always with the longitudinal axes of all the pipe lengths in the same direction, i.e., with the axes of the pipe lengths never changing direction once the pipe lengths are loaded on the ship, the handling time for the pipe lengths and welded pipe-sections is considerably reduced as compared to a conventional arrangement where the pipe lengths are not always aligned in the same direction. As to the question of maintaining stability of the vessel or the ship during pipe laying, it has been found by the inventors that by far the most optimal position for the pipe laying boom is the center of the vessel which also happens to be least susceptible to swaying and all undesirable movements including a horizontal oscillatory movement of the vessel technically known by the term "yawing". With the pipe laying boom arranged in the center of the vessel, an accurate course for the pipe laying under the water is assured within normal tolerances allowable for the course of the vessel per se.

It is also advantageous to have a butt welder apparatus built into the pipe laying boom so that when pipe assemblies (comprising two or more shorter lengths of pipes welded on board end to end) are hoisted and positioned for pipe laying, such pipe assemblies can be welded in the hoisted position end to end with a free end of a progressively laid pipeline. It is also expedient to have some suitable built-in means for treating a welded surface of a pipe before being lowered into water, for minimizing corrosion of the pipe welded surface in service.

SUMMARY OF THE INVENTION

The present invention takes a plurality of steps to obviate the problems of the prior art arrangements by providing distinct means to render the pipe laying process more efficient, speedy and reliable.

The invention in its broad form consists in an underwater pipe laying vessel of the type which installs an underwater pipeline by progressively adding shorter lengths of pipeline by welding to a free end of a pipeline in progress, the vessel having at least one deck and comprising a well which is formed substantially at the center of the vessel and extends from a vessel-deck level to a bottom of the vessel; a pipe laying boom of hollow construction mounted within said well and having a through longitudinal passage which in use accepts said lengths of pipeline to be added on by welding to said free end of the pipeline, said boom having a lower end which penetrates and extends beyond the bottom of the vessel; a swivel mounting means which mounts the boom inside said well, said swivel mounting means having a horizontal swivel axis about which the boom can be given controlled oscillatory movement; control means to control an oscillatory position of said boom about said swivel axis; guiding support means disposed at substantially the lower end of said longitudinal passage of the boom to support and guide said free end of said pipeline in progress during use; welding means disposed within said longitudinal passage to enable welding of said free end of the pipeline in progress with a mating end of an added length of pipeline; swivel arm means to pick up said length of pipeline to be added and to guide the same through said longitudinal passage of the boom to abut against said pipeline free end; and means to lower the added length of pipeline from the hollow boom downwards after welding.

In a preferred embodiment illustrated herein, individual pipe lengths which are delivered from an outside source to the pipe laying vessel are stored all longitudinally of the vessel, at a predetermined level, for example, at the main deck-level. A plurality of pipe lengths welded together end to end at a welding deck-level forms a pipe assembly; several pipe assemblies are stored at a level below the welding deck-level which in itself is below the main deck-level. Advantageously, the storage of the individual pipe lengths and welded pipe assemblies is arranged at suitable levels in the vessel in such manner that each time the pipe material is required to be moved, it is always moved towards the front of the ship or vessel. A pipe laying boom which is hollow at least in part is arranged to be mounted in a well which is located at the center of the vessel. The boom preferably is inclined towards the front of the vessel and makes an acute angle with the horizontal of the ship main deck. The boom is provided with a swivel arm which is able to pick up a pipe assembly from a horizontal position from substantially the main deck level and locate the pipe assembly in the hollow of the boom, so that the free bottom end of the assembled pipe assembly abuts against a free end of the pipeline which is held inside the boom in the process of being installed. A welding unit, for example, a flash butt welder which is built into the hollow boom completes welding between the assembled pipe assembly and the end of the pipeline. Situated under the welding unit is a Jacketing device which expediently treats the welded portion to prevent corrosion of the welded joint in use. Once the aforesaid operations are completed satisfactorily, the pipe is lowered to the extent of the length of one pipe assembly and prepared for welding the next pipe assembly by an add-on process. To facilitate holding a pipe assembly in position inside the hollow region of the boom, there is provided a collet gripper trolley in substantially an upper region of the hollow boom. The hollow boom per se somewhat extends downwardly below the bottom of the well and incorporates a pipeline section guide and pipeline section support so as to mitigate any excessive mechanical stresses which might occur in the pipe cross-section of the pipe line when the pipeline end is held during the pipe laying for the time interval during the butt welding. The swivel arm, when it is picking up an add-on pipe assembly, expediently swivels about a horizontal axis which is close to the location where the hollow boom penetrates the main deck surface. A mobile crane capable of moving on rails substantially over the entire periphery of the vessel at the main deck-level is provided to facilitate unloading and storing pipe lengths taken from a delivery ship.

By virtue of the fact that pipe assemblies each comprising a plurality of pipe lengths are added on each time by welding, rather than adding individual pipe lengths, the pipe laying operation is rendered significantly speedy by the use of the present invention and is limited only by how fast the pipe assemblies can be picked up by the swivel arm of the boom, and how fast a welded joint can be completely treated so that the pipe can be lowered. The vessel is controlled to move forward as the pipe laying progresses.

BRIEF DESCRIPTION OF THE DRAWINGS

Other features and advantages of the invention will be apparent from the following description of a preferred exemplary embodiment to be studied in conjunction with the accompanying drawings wherein:

FIG. 4 illustrates a diagrammatic cross-section of the vessel of FIG. 1, the cross-section being taken through a well in which a swivelled pipe laying boom is disposed; and FIG. 5 shows a typical roller conveyor used in the invention to transport a pipe/pipe train longitudinally.

Figure 1:
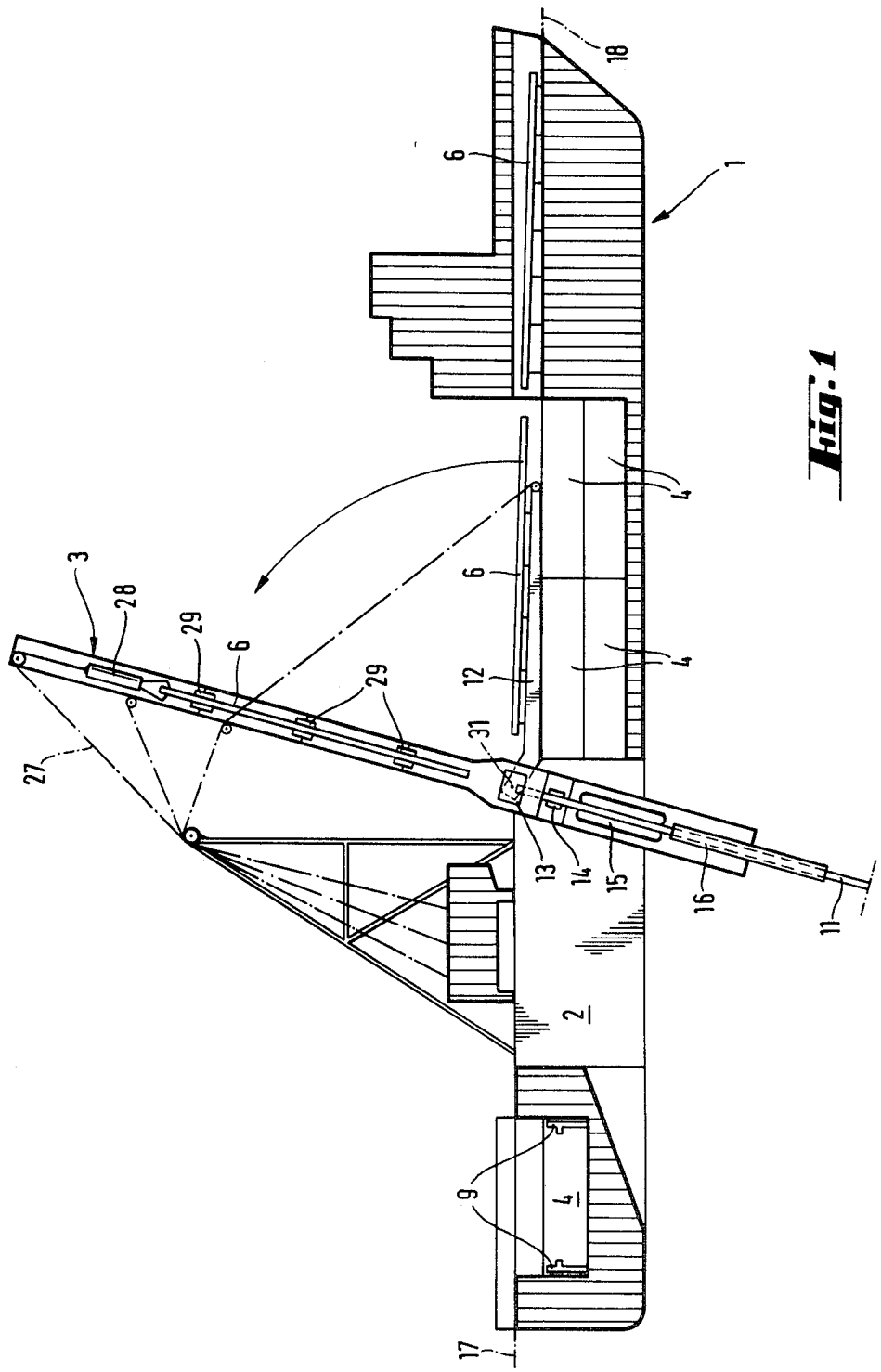
FIG. 1 shows a diagrammatic longitudinal cross-section of a pipe laying vessel using the invention.

The following is a listing of the various reference numerals together with associated legends, given to facilitate understanding the components in the drawings.

LIST OF REFERENCE NUMBERS

1. Pipe laying vessel
2. Pipeline section well
3. Pipe laying boom
4. Loading/holding space
5. Individual pipes
6. Pipe assemblies
7. Pipe train
8. Pipe lift
9. Derrick crane
10. Loading crane
11. Pipeline section
12. Swivel arms
13. Flash butt welding unit
14. Jacketing unit
15. Pipeline section guide
16. Pipeline section support
17. Crane deck
18. Welding deck
19. Loading/holding space deck
20. Load turning equipment
21. Pipe storage
22. Storage for pipe assemblies
23. Rollers
24. Trolley
25. Conveyor belts
26. Lift pipe train
27. Cable line
28. Collet gripper trolley
29. Holding device
30. Welding position
31. Swivel axis
32. Support of pipeline section
33. Station

DESCRIPTION OF PREFERRED EMBODIMENT

Figure 2:
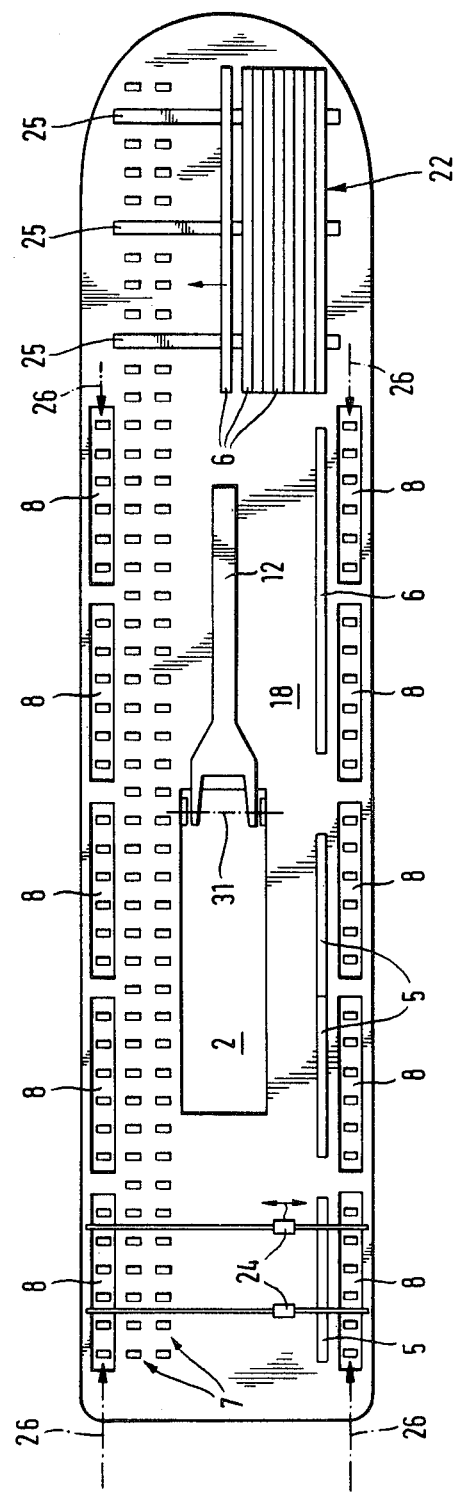
FIG. 2 is a schematic top view of a welding deck of a pipe laying vessel of FIG. 1.

The pipe laying vessel 1 as illustrated shows a crane deck 17 as well as a lower welding deck 18 and one or several loading/holding decks 19, which serve for loading, storage and processing of the individual pipes 5. Pipe assemblies, each of which may be fabricated by welding a plurality of pipe lengths end to end, are produced and stored on the welding deck generally illustrated in FIG. 2. The facilities provided for such welding purposes on the welding deck are not crucial to the thrust of the present invention, and may be comparable to the welding facilities available at any modern welding plant which can complete and inspect pipe welds which are circumferential end to end welds. Midship, i.e., in the area of the least ship movement (in heavy seas), a pipeline well 2 is provided. An end of the laid pipeline shown as pipeline section 11, is held and supported through the well 2 by a hollow pipe laying boom or tower 3 which is capable of swivelling about a horizontal swivel axis 31 running across the ship. The pipe laying boom 3 carries a swivel arm 12, which is also hinged for movement, whereby, a pipe assembly produced from two individual pipes 5, is brought into welding position 30, (FIG. 4), opposite of the pipeline end 11 and is held in this position. The individual pipes 5 are preferably taken on board from a feeder ship (not shown) by means of a loading crane 10, which moves on the crane deck 17 along the sides of the pipe laying vessel 1 on both sides of the pipeline well 2. The pipes themselves may be of any suitable material which meets with the requirements and which accepts welding. The pipes may be fabricated with a seam-weld, or may be extruded or roll-formed as convenient. The manner of manufacture of the pipes is not very crucial to the broad concept of the invention. Also provided are a swing-free load suspension and heavy sea follower equipment as well as a load turning device 20 for handling the pipes 5.

The pipes are rearranged into pipe trains 7 and elevated pipe trains 26 horizontally, aided by pipe lifts 8 and transported by means of holding cranes; they are prepared and welded into pipe assemblies 6 and these are made accessible one at a time to the swivel arm 12 which brings them into welding position 30. To facilitate handling and movement of the pipes and pipe assemblies on the decks 17 to 19 and in the compartments formed by these decks, as well as in the longitudinal and transverse bulkheads 4, pipe storage areas 21 and 22, as well as rollers 23, trolleys 24 and conveyor belts 25 are advantageously provided. Additionally, there may be one or more holding cranes which move across the length of the vessel to facilitate transverse movement and transfer of pipes and pipe assemblies. Alternatively, conveyors may be provided for the purpose. A pipe assembly 6 from storage 22 is fitted to the end of an existing pipeline section 11 by means of the swivel arm 12, and held in position. The position of the pipeline section 11 is mainly determined by the pipeline section guide 15; the pipeline section support 16 at the bottom portion of the boom 3, relieves undue mechanical strain on the pipeline section 11. The boom 3 can be adjusted with the aid of a cable or cables to any desired angle to the horizontal. A similar arrangement is also provided for the swivel arm 12.

Once the alignment of the pipe assembly 6 to be added on to the pipeline section 11 has been finished, the flash butt welding unit 13 located at the foot of the hollow boom 3 is actuated in order to weld and connect pipeline section 11 with the pipe assembly 6. The flash butt welding unit comprises equipment for production of a radially directed weld seam, at the same time providing the necessary axial compressive force between the pipes in the region of the weld. Immediately thereafter, the jacketing device 14 functions to apply a coating to protect the welded region against corrosion and other deterioration after placement under water. The specific details of application of a protective layer to the welded region by the jacketing device do not form a crucial part of this invention and will be intelligible to one who is skilled in the art. The jacketing device may, however, need periodic restoration and upkeeping in view of maintaining cathodic protection. At this juncture after welding and application of a protective layer, the pipeline section end 11 is held by a support 32 and the pipe assembly 6 is held by a cable line 27 of a collet gripper trolley 28 which is controlled by a cable line and is operable from a control cabin 33 of the boom 3. The gripper trolley has a means for form locking and holding of the pipe assembly, as well as a means for transfer of the pipe assembly into the hollow region of the boom 3 and for adjusting the pipe assembly position as necessary. The welded length of the pipe after each welding operation is slowly lowered as the vessel moves forward; the vessel is then prepared for welding and adding on a further pipe assembly 6, and so on and so forth till the pipe laying is progressively completed.

Figure 3:
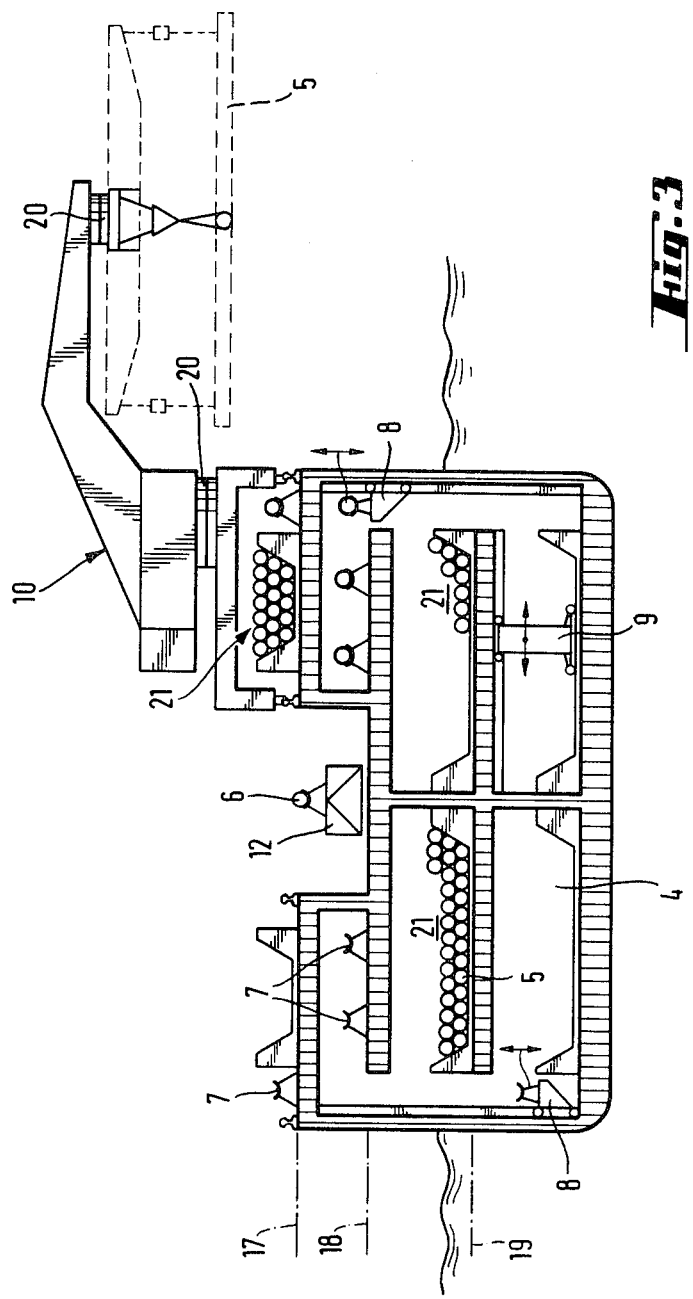
FIG. 3 illustrates a diagrammatic cross-section of the vessel of FIG. 1, the cross-section being taken in a pipe storage area.

As illustrated exemplarily in FIG. 3, the crane deck 17, the welding deck 18 and the holding deck are arranged advantageously vertically one below the other, the crane deck 17 being the uppermost. From the point of view of smooth material flow, it is seen that as in a production line, pipe lengths from the crane deck can easily be lowered onto the welding deck 18 for preparing pipe assemblies of two or more pipes. In point of fact, several pipe assemblies can be welded simultaneously and be kept ready for being hoisted by the swivel arm 12. It is also conceivable that welded pipe assemblies can be stored in reasonable numbers on the holding deck 19 as illustrated.

The loading crane 10 is expediently provided with two load turning devices 20 which can be used to great advantage in loading pipe lengths from a delivery ship (not shown) on to the loading deck of the pipe laying vessel even when the pipe laying operation is in progress. Furthermore, since the loading crane 10 can traverse almost the complete periphery of the vessel on rails, there is almost no limitation on where the delivery ship can get access for pipe unloading onto the pipe laying vessel.

The transportation of pipe trains and pipe assemblies, as illustrated in FIG. 5, is preferably with the aid of rollers to achieve a speedy and economical operation. However, any alternative commercially known arrangement is admissible as well; details of such alternative arrangements are intelligible to those who are skilled in the art. It is also to be appreciated in the context of the present invention that a deliberate controlled movement of the individual pipes and pipe assemblies from the back region of the vessel towards the front offers a distinct advantage in that inasmuch as the completed pipe assemblies are to be picked up substantially in a front region of the vessel, there is almost no wasteful movement of raw material which would impede speed of operation.

Pipe lifts are arranged along the longer sides of the ship length on the welding deck and the storage deck, for vertical movement of the pipes. The pipe lifts in their operation complement the function of the deck cranes.

Optionally, the pipe ends of individual pipes or welded pipe assemblies may have to be machined prior to welding, in the event the end faces of the pipes are damaged during transportation or storage. Occasionally, however, there may be need to reface an end of a pipe or a pipe assembly if there has been an improper welding process which has to be redone after separating the welded joint.

In order to ensure a smooth, safe and speedy operation, all pipe trains are preferably provided with electronic monitoring and protection systems which in their most elemental form might take the shape of sensors and interlocks. For example, a pipe can be transported on a pipe train only if the recipient pipe lift is in its proper receiving level to receive a transported pipe, and/or if an enroute safety signal is furnished similar to signals in railroad systems. Likewise, if a certain zone is occupied by a pipe assembly, additional pipe assemblies may not be allowed to enter the same area unless a specific enter-clear signal is available. The structural details of such interlocking safety arrangements do not form a main feature of this invention in its broad form and will be intelligible to those who are skilled in the art.

The invention provides a very efficient and speedy apparatus and method for underwater pipe laying, which overcome the disadvantages of the prior art. At least some of the outstanding aspects of the pipe laying vessel described hereinabove comprise:

(i) handling, storage and transportation arrangements for pipe lengths in such a manner that the pipes stay on the vessel always with their longitudinal axes parallel to the length of the ship or vessel;

(ii) the movement of the individual pipes and pipe assemblies is generally from the back of the vessel towards the front of the vessel so as to stock fabricated pipe assemblies which are ready for use substantially in the vessel front, to facilitate the loading of pipe assemblies into the hollow boom;

(iii) a hollow pipe laying boom located in the center of the vessel to ensure maximum stability of the vessel and to ensure accuracy of the pipe laying course, as well as to facilitate what is known in the art as "J" shape pipe laying;

(iv) use of pipe assemblies for add-on welding inside the hollow boom, rather than using individual pipe lengths; the use of fabricated pipe assemblies each of which comprises at least two individual pipe lengths accelerates the pipe laying process;

(v) a collet gripper trolley which includes a holding device which has the capability of form-locking as well as the capability of adjusting the position of the pipe assembly as necessary and of lowering the pipe assembly into the hollow region of the boom;

(vi) a built in welder inside the hollow boom, which is followed by jacketing device offering corrosion-proof treatment for a welded zone; and (vii) guiding means and support means in the bottom region of the hollow boom to support the pipeline and to relieve excessive stresses which might be induced in the material of the pipe.

The invention is not to be taken as limited to all the details thereof described hereinabove, since modifications and variations thereof may be made without departing from the spirit or scope of the invention.

What is claimed is:

1. An underwater pipe laying vessel of the type which installs an underwater pipeline by progressively welding and adding shorter lengths of pipeline to a free end of a pipeline is progress, the vessel having at least one deck and comprising:

a well which is formed substantially at the center of the vessel and extending from a vessel deck-level to a bottom of the vessel;

a pipe laying boom of hollow construction mounted within said well and having a through longitudinal passage which in use accepts said lengths of pipeline to be added on by welding to said free end of the pipeline, said boom having a lower end which penetrates and extends beyond the bottom of the vessel;

a swivel mounting means which mounts said boom inside said well, said swivel mounting means having a horizontal swivel-mount axis about which said boom can be given controlled oscillatory movement;

control means to control an oscillatory position of said boom about said swivel-mount axis;

guiding support means disposed at substantially the lower end of said longitudinal passage of said boom to support and guide said free end of said pipeline in progress during use;

butt-welding means disposed within said longitudinal passage to enable welding of said free end of the pipeline in progress with a mating end of an added length of pipeline;

swivel means having a length and swiveled about a horizontal axis substantially close and parallel to said horizontal swivel-mount axis to pick to pick up said length of pipeline to be added and guide the same through said longitudinal passage of said boom to abut against said pipeline free end, said swivel arm length extending radially from said horizontal axis;

means to lower the added length of pipeline from said hollow boom downwards after welding.

2. A pipe laying vessel as in claim 1, wherein said means to lower the added length of pipeline comprises a collet gripper trolley.

3. A pipe laying vessel as in claim 1, wherein said welding means comprises a flash butt welder.

4. A pipe laying vessel as in claim 1, including jacketing means disposed below the welding means for treating a welded pipe surface to make said pipe surface corrosion resistant.

5. A pipe laying vessel as in claim 1, including pipe-storing and pipe-moving means which would restrict said shorter lengths of pipeline always to have an orientation which is parallel to said length of said swivel arm means, whereby said shorter pipeline lengths are always oriented only one way during pipe storing and pipe moving, to increase pipe laying efficiency.

6. A pipe laying vessel as in claim 1, wherein said swivel mounting means and said pipe laying boom have means to handle pipe assemblies, wherein each pipe assembly is fabricated by welding at least two pipe lengths end to end.

7. A pipe laying vessel as in claim 1, wherein the vessel includes additional second and third decks below said at least one deck.

8. A pipe laying vessel as in claim 7, wherein said at least one deck is a crane-deck including a travelling loading crane and pipe storage racks on either side of said well, said travelling loading crane being able to travel on either side of said well.

9. A pipe laying vessel as in claim 8, wherein said second deck is located below said crane-deck, said second deck being a welding deck including facilities for welding to fabricate pipe assemblies from at least two pipe lengths welded end to end.

10. A pipe laying vessel as in claim 9, wherein said third deck is located underneath said second deck, said third deck having facilities for storing pipe assemblies, said third deck also having pipe lifts.

11. A pipe laying vessel as in claim 10, wherein said second deck has a plurality of longitudinal conveyor pipe trains arranged along the length of the vessel, each said conveyor comprising rollers installed to facilitate transport-conveying of pipes longitudinally.

12. A pipe laying vessel as in claim 1, wherein said control means to control an oscillatory position of the boom includes wire cables attached to said boom.

13. A pipe laying vessel as in claim 1, including a monitoring and control station located on said first deck proximate to said swivel axis.

14. A pipe laying vessel as in claim 8, wherein said loading crane includes a horizontal rotary platform means capable of full circular movement.

15. A pipe laying vessel as in claim 11, wherein at least some of the pipe trains are provided with electrical monitoring and protection means which sense the presence of a pipe or pipe assembly on a train and prevent additional pipes or pipe assemblies from being allowed onto a pipe train which is occupied.

16. A pipe laying vessel as in claim 7, which includes at least one holding crane on each of said decks, the holding crane being capable of moving across the length of the vessel.

17. A pipe laying vessel as in claim 3, wherein said flash butt welder includes means to apply axial compressive force between said free end of said pipeline and a mating end of a pipe assembly during welding.

18. A pipe laying vessel as in claim 4, including a pipeline section guide disposed in said longitudinal passage of the boom below said jacketing unit for supporting and holding the free end of said pipeline in progress so as to ensure proper alignment of the pipeline end and pipeline assembly to be added on by welding, said pipeline section guide having clamping means to prevent excessive stresses in said pipeline and because of any undesired movements of the vessel caused by high seas during installation and welding.

19. An underwater pipe laying vessel which installs a pipeline using "J" shape installation, by progressively adding pipeline lengths to an existing pipeline by welding each pipeline length to said pipeline as installation progresses, the vessel having a main top deck and comprising:
a pipe laying well which is formed substantially at the center of the vessel, and extending from said main deck to a bottom of said vessel;
a pipe laying boom of hollow construction mounted within said well, said boom having a through passage which allows a pipe cross-section to go clear through, said boom having a lower end which penetrates and extends beyond the bottom of said vessel;
a swivel mounting means which mounts the boom so as to project upwardly of said main deck, said swivel mounting means having a horizontal swivel axis about which the boom can be given controlled oscillatory movement;
support means to control an oscillatory position of said boom about said swivel axis;
welding means in the form of a flash butt welder disposed at least partly within said through passage in a region proximate to said swivel axis, said welding means including pressure applying means to hold under pressure a free end of said pipeline and a mating end of an assembled pipe length;
guiding support means disposed inside said through passage of said boom for guiding and supporting said free end of said pipeline in use and also to relieve any undue stresses occurring on said free end of said pipeline caused because of vessel movements because of high seas during welding for pipe laying;
swivel arm means swivelled about a horizontal axis to pick up said each pipeline length from said main deck and to assembly said each pipeline length into said through passage in the boom to abut against said pipeline free end; and
controlled means to selectively hold and lower an upper portion of an added on welded pipe length from within said through passage into an outside region of the ship bottom through the well for pipe laying.

20. A method of underwater pipe laying using a pipe laying vessel for progressively welding and adding shorter lengths of pipe to a free end of a pipeline which is in progress, by using a hollow swivelled boom mounted in a well which is formed substantially in the center of the vessel which has at least a main deck, said hollow boom having a lower end penetrating and extending beyond the vessel bottom, the method comprising the steps of:
receiving individual pipe lengths from a delivery ship onto the main deck such that the pipe lengths are always aligned longitudinally with respect to the vessel length;
forming pipe assemblies by welding at least two said pipe lengths end to end and storing the pipe assemblies so that their lengths are always oriented along the length of the vessel;
supporting and holding a free end of said pipeline in progress at substantially a mid-portion of said hollow boom, said pipeline in progress entering said hollow boom from its said lower end;
assembling one of said pipe assemblies by insertion, from a top region of said hollow boom to abut against said supported free end of said pipeline;
applying an axially compressive force to hold said free end of said pipeline and a mating end of an assembled pipe assembly;
butt welding said free end of said pipeline and said mating end of a said pipe assembly;
treating a welded pipe surface for corrosion prevention in service; and
lowering said pipeline and moving the vessel forward for adding a second of said pipe assemblies.

21. A method as in claim 20, wherein the step of forming pipe assemblies comprises welding two or more pipe lengths on a welding-deck which is situated below said main deck, and holding said pipe assemblies in temporary storage in a holding deck below said welding deck.

22. A method as in claim 21, wherein the method step of assembling comprises initially picking up a said pipe assembly in a direction parallel to the vessel length from a region in front of the boom.

23. A method as in claim 21, including transporting individual pipe lengths and welded assemblies on roller-conveyor type pipe trains on said welding-deck.

24. A method as in claim 20, wherein the step of receiving individual pipe lengths comprises using a loading crane which is movable on either side of said well in directions parallel to the vessel length, said loading crane having a load turning device capable of complete revolution in a horizontal plane.

25. A method as in claim 20, wherein the step of lowering comprises lowering using wire ropes.

26. A method as in claim 21, including monitoring movements of pipe lengths and pipe assemblies by electronic sensors and interlocks.

* * * * *